US008240274B2

(12) United States Patent
Greene et al.

(10) Patent No.: US 8,240,274 B2
(45) Date of Patent: Aug. 14, 2012

(54) ANIMAL CAGE AND METHOD OF ASSEMBLY THEREOF

(75) Inventors: Michael E. Greene, Muncie, IN (US); Bryan W. Jennings, Muncie, IN (US); Terrance L. Jones, Muncie, IN (US); David L. Clemmons, Dunkirk, IN (US)

(73) Assignee: Mid-West Metal Products Co., Inc, Muncie, IN (US)

( * ) Notice: Subject to any disclaimer, the term of this patent is extended or adjusted under 35 U.S.C. 154(b) by 60 days.

(21) Appl. No.: 12/630,390

(22) Filed: Dec. 3, 2009
(Under 37 CFR 1.47)

(65) Prior Publication Data
US 2011/0132273 A1 Jun. 9, 2011

(51) Int. Cl.
*A01K 1/03* (2006.01)
(52) U.S. Cl. .......................... 119/453; 119/472; 119/474
(58) Field of Classification Search .......... 119/452–453, 119/459, 461, 472, 474, 480–482, 498
See application file for complete search history.

(56) References Cited

U.S. PATENT DOCUMENTS

| | | | | | |
|---|---|---|---|---|---|
| 162,142 | A | * | 4/1875 | Belmer | 119/459 |
| 2,822,780 | A | * | 2/1958 | Buell | 119/472 |
| 3,698,360 | A | * | 10/1972 | Rubricius | 119/458 |
| 4,736,709 | A | * | 4/1988 | Migler | 119/472 |
| 5,000,121 | A | * | 3/1991 | Daily | 119/461 |
| 5,456,208 | A | * | 10/1995 | Choenchom | 119/452 |
| 5,996,536 | A | * | 12/1999 | King | 119/459 |
| 6,550,424 | B1 | * | 4/2003 | Gao | 119/474 |
| 6,763,784 | B1 | * | 7/2004 | Liu | 119/452 |
| 6,832,580 | B2 | * | 12/2004 | Marchioro | 119/452 |
| 6,990,926 | B2 | * | 1/2006 | Gao | 119/461 |
| 7,203,980 | B2 | * | 4/2007 | McBrayer et al. | 5/2.1 |
| 7,308,868 | B1 | * | 12/2007 | Borg | 119/452 |
| 7,827,939 | B2 | * | 11/2010 | Yang | 119/461 |
| 7,827,940 | B2 | * | 11/2010 | Silverman | 119/474 |
| 2007/0277745 | A1 | | 12/2007 | Clemmons et al. | |

OTHER PUBLICATIONS

Avian Adventures, "Avian Adventures 2007-2008 Catalog", brochure pp. 1-12, Avian Adventures, 13601 Preston Rd. #910E, Dallas, TX 75240.

\* cited by examiner

*Primary Examiner* — Rob Swiatek
*Assistant Examiner* — Ebony Evans
(74) *Attorney, Agent, or Firm* — Taft Stettinius & Hollister LLP; Stephen F. Rost, Esq.

(57) ABSTRACT

The present invention relates to a method of forming an enclosure assembly without using tools or fasteners to complete the assembly. The method includes forming a base from a side support, front support, and a plurality of casters. A door assembly and back wall are coupled to the base by aligning a plurality of pegs therefrom with corresponding openings defined in the base. A plurality of protruding wires of a bottom wall are aligned and inserted into corresponding openings defined in the door assembly and back wall. In addition, a plurality of pegs that protrude from a side wall are inserted into a plurality of corresponding openings defined in the door assembly and back wall such that the side wall couples to the door assembly and back wall. The method also includes coupling a top wall to the door assembly, side wall, and back wall. A shelf assembly can be coupled to the side wall and/or back wall, and a ramp can be pivotably coupled to the shelf assembly.

14 Claims, 15 Drawing Sheets

ANIMAL CAGE AND METHOD OF ASSEMBLY THEREOF

BACKGROUND

The present invention relates to an enclosure assembly, and more particularly to an enclosure assembly useful for containing animals which requires no tools or fasteners for assembly.

Animal cages and the like are very popular for pet owners to purchase for housing their domestic pet. The cage can allow the pet owner to enjoy their pet while also maintaining the pet in an enclosed and controlled environment. Cages or other similar enclosures can be made from a variety of materials such as plastic, iron, steel, wood, aluminum, woven fabric, etc. The material from which the cage is made can depend on whether the cage is primarily used indoors or outdoors. In any event, pet owners want cages to be durable so that animals enclosed within the cage cannot escape and animals outside the cage cannot enter.

Cages also can include multiple functions in addition to providing a safe enclosure for the pet. For example, the cage can provide a sanitary environment for the pet, and in some instances where more than one pet is contained within the same cage, the cage can include structure for dividing the interior thereof for separating the multiple pets. Also, some cages can be easily transportable. For instance, in U.S. Publication Ser. No. 2007/0277745, a containment system is described as being collapsible for storage. Other similar cages can include a handle or other device for transporting the cage.

Unfortunately, most cages can be difficult for a layperson to assemble and setup. Many, if not all, cages require tools and fasteners for assembly. For example, in U.S. Publication Ser. No. 2007/0277745, it is described that all panels and the floor pan are connected to each through conventional means, primarily screws, washers and threaded inserts. When purchased, these cages may not provide the tools or correct number of fasteners for assembling the cage, and even when the tools and correct number of fasteners are provided, assembly often requires more than one person to complete. This can be inconvenient to the pet owner who wants an easy-to-assemble cage that requires minimal time and effort for assembling the cage. Additional inconvenience is found when the owner does not have the requisite tools or fasteners for assembling the cage. In such a circumstance, the owner must purchase the proper tools and fasteners which ultimately increases the cost of the cage.

Therefore, a need exists for an enclosure or cage assembly that can be assembled without the use of tools or fasteners. In addition, the enclosure or cage assembly needs to be convenient and easy to assemble and not require more than one person to complete the assembly. Lastly, once assembled, the enclosure or cage assembly needs to provide a safe and sanitary environment for the pet, be easy to maintain and clean, and provide enjoyment to both the pet and the owner.

SUMMARY OF THE INVENTION

In an exemplary embodiment of the present invention, a method of forming an enclosure assembly is provided that requires no tools or fasteners to complete the assembly. The method includes forming a base from a side support, front support, and a plurality of casters. A door assembly and back wall are coupled to the base by aligning a plurality of pegs with corresponding openings defined in the base. A plurality of protruding wires of a bottom wall are aligned and inserted into corresponding openings defined in the door assembly and back wall. In addition, a plurality of pegs that protrude from a side wall are inserted into a plurality of openings defined in the door assembly and back wall such that the side wall couples to the door assembly and back wall. The method also includes coupling a top wall to the door assembly, side wall, and back wall. A shelf assembly can be coupled to the side wall and/or back wall, and a ramp can be pivotably coupled to the shelf assembly.

In another embodiment, a method of forming an enclosure assembly includes forming a base from a first side support, a second side support, a front support, and a plurality of casters. A first assembly is formed and coupled to the base. The first assembly includes a first door assembly, a first back wall, and a first side wall. A plurality of protruding wires of a bottom wall are aligned with a plurality of openings defined in the first door assembly and first back wall. The method further includes coupling an intermediate wall to the first assembly. The intermediate wall can include a cutout portion defined therein, and when coupled, the intermediate wall is disposed substantially parallel to the bottom wall.

The method also includes forming a second assembly having a second door assembly, a second back wall, and a second side wall. In addition, a top wall is coupled to the second door assembly, second back wall, and the second side wall. The second assembly can be coupled to the first assembly such that the first assembly is disposed beneath the second assembly. In addition, a first shelf assembly can be coupled to the first back wall or first side wall. Likewise, a second shelf assembly can be coupled to the second back wall or second side wall. To provide access between the first assembly and second assembly, a ramp is pivotably coupled to the first shelf assembly, the intermediate wall, and the second shelf assembly. Advantageously, this method can be completed without the use of a tool or fastener. In other words, each component can be coupled to another without the use of a hammer, screwdriver, wrench, screws, bolts, nuts, washers, nails, etc.

In a different embodiment of the present invention, an animal enclosure assembly is provided. The animal enclosure assembly includes a base assembly having a first side support, a second side support, a plurality of front supports, and a plurality of casters. A door assembly is also provided and has a plurality of pegs that engage openings defined in the base assembly. The door assembly comprises a first and second door which are hingedly coupled to a door frame. Each of the first and second doors has a latch assembly for opening and closing the door. The animal enclosure assembly also includes a back wall having a plurality of pegs that engage openings defined in the base. The back wall is oppositely disposed from the door assembly in the enclosure assembly. A bottom wall having protruding wires engage openings defined in the door assembly and back wall.

The assembly further includes a side wall having a top edge and a bottom edge. The side wall also has a plurality of pegs protruding from the bottom edge which engage openings defined in the base and a plurality of tabs protruding from the top edge which engage openings defined in the door assembly and back wall. A top wall of the assembly has a plurality of pegs protruding therefrom. The plurality of pegs are pressed into corresponding openings defined in the door assembly, back wall, and side wall for coupling the top wall thereto. A shelf assembly is also provided that is disposed substantially parallel with the top wall and bottom wall. The shelf assembly has a shelf with a U-shaped member. The U-shaped member has a hooked end that engages an opening defined in the side wall and a curved surface that rests against the side wall. The animal enclosure assembly further includes at least one ramp having a hook disposed at one end thereof such that the ramp is pivotably coupled to the shelf assembly.

One advantage of the above-mentioned embodiments is that no fasteners or tools are required for assembly. This provides convenience when assembling the enclosure assembly and avoids the inconvenience commonly encountered when an assembly is missing one or more tools or fasteners. Also, for those who do not have tools such as a hammer or screwdriver, embodiments of the present invention do not require any tools. Consumers therefore do not have to purchase new tools, nor do they have to search for used tools or suitable replacements. Also, the assembly process can be easily completed by a single person.

Another advantage is that the cost of the enclosure assembly is less because tools and fasteners are not required nor provided. For example, quantities of fasteners such as screws or nails are often packaged in individual plastic bags so that these fasteners are not easily lost during shipment or assembly. In addition, a machine or individual has to count the number of fasteners to ensure each assembly includes the proper quantity. Since each fastener has a cost associated with it, by eliminating the need for tools or fasteners, the entire assembly becomes cheaper to manufacture and sell.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
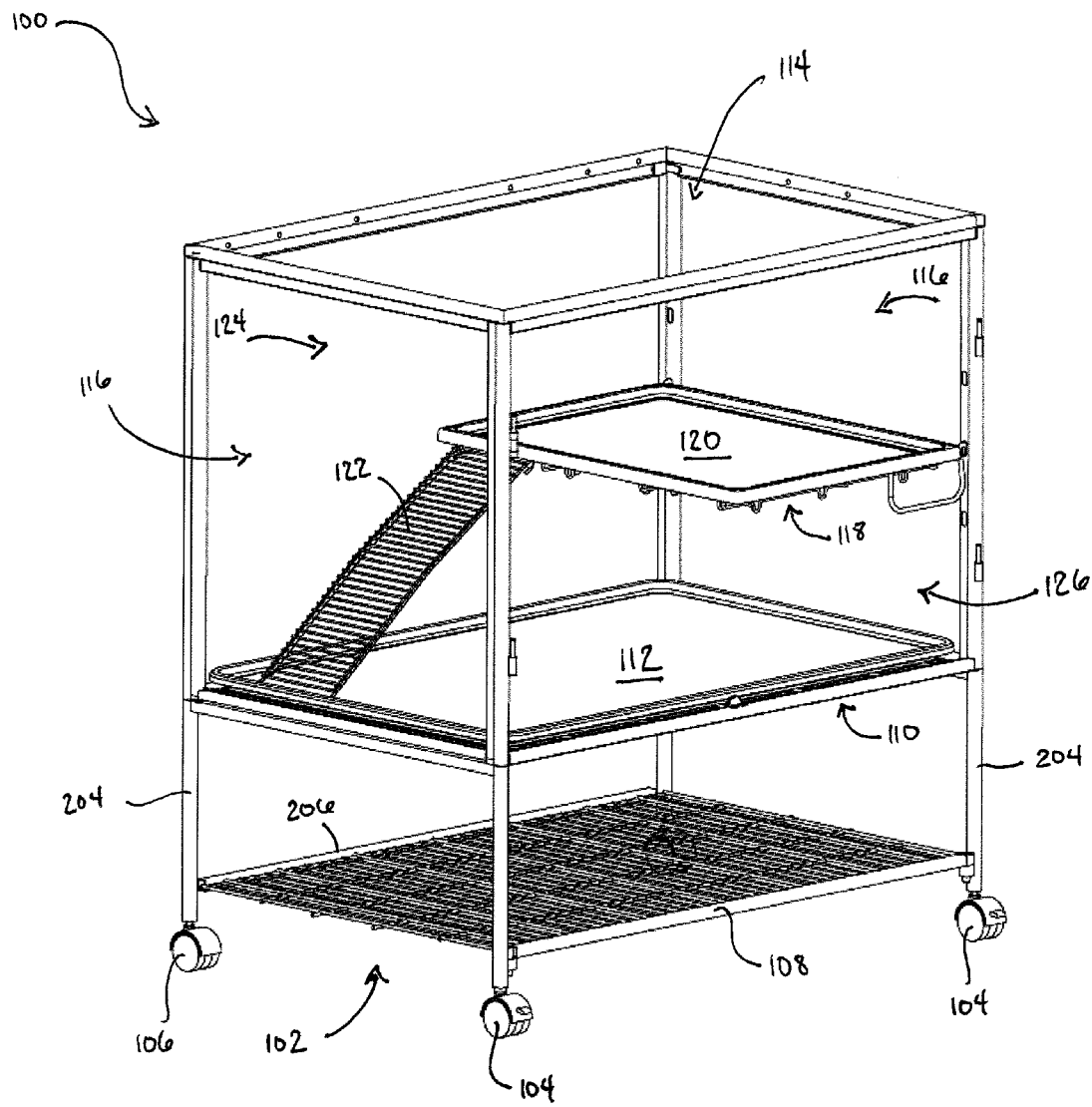
FIG. 1 is a perspective view of an enclosure assembly.
Figure 2:
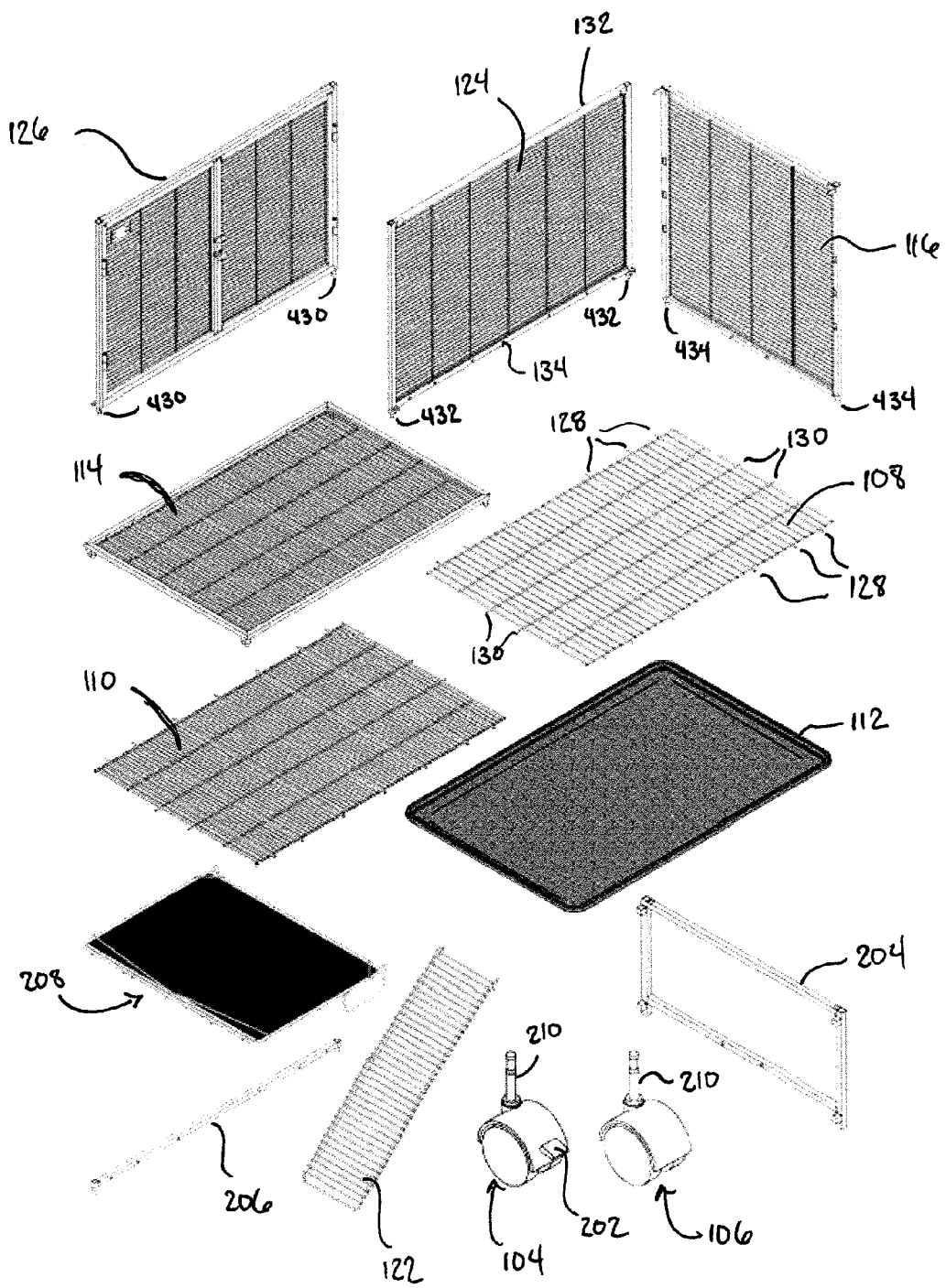
FIG. 2 is a perspective view of individual components of the enclosure assembly of FIG. 1.

With reference to FIGS. 1 and 2, an exemplary embodiment of an enclosure assembly 100 is shown. In this embodiment, the enclosure assembly 100 includes a base 102, a top wall 114, a back wall 124, a pair of side walls 116, and a door assembly 126. The top wall 114, back wall 124, side walls 116, and door assembly 126 can be made of a steel wire mesh; however, the wire mesh is removed in FIG. 1 so that the interior of the enclosure assembly 100 can be seen more easily. In other embodiments, the different walls can be made from aluminum, plastic, or other material known to one skilled in the art.

In the case of the steel wire mesh, an outer powder coating covers the wire mesh. The powder coating can have any color. Individual wires of the wire mesh can be spaced at any distance. For example, in one embodiment, the wires can be spaced between ¼" to ½". In an advantageous embodiment, the wires can be spaced approximately ⅜". In one non-limiting embodiment, the cage assembly 100 can be approximately 24"×36"×39".

With reference to FIG. 2, the base assembly 102 is formed by a side support 204 and front support 206. The method of assembly will be described in further detail below, but with respect to the embodiment shown in FIG. 1, a pair of side supports 204 are disposed on the same ends of the enclosure assembly 100 as the pair of side walls 116. A pair of front supports 206 are disposed at both the front and back sides of the base assembly 102. When assembled, the side supports 204 and front supports 206 form a rectangular box-like structure. The side support 204 and front support 206 can be made of any material such as steel, aluminum, plastic, and the like.

The base assembly 102 can include a first shelf 108. The first shelf 108 can be made of steel wire mesh or other material. In addition, a pan or other solid structure (not shown) can be placed on top of the shelf 108. The first shelf 108 is not surrounded or enclosed by the door assembly 126, back wall 124 or side walls 116. Instead, a bottom wall 110 separates the first shelf 108 from the enclosure. As such, the first shelf 108 is open to its surrounding environment and can be used for storing items such as food, pet toys, cleaning supplies, and other items. This is advantageous because items being stored on the first shelf 108 are not accessible to an animal enclosed within the assembly 100.

The base assembly 102 can also include casters so that the enclosure assembly 100 can be easily transported between locations. In the embodiment of FIG. 1, a pair of lockable casters 104 are disposed near the front of the enclosure assembly 100 and a pair of non-lockable casters 106 are disposed near the back of the assembly 100. The placement of the casters is interchangeable. The lockable casters 104 can include a locking tab 202 as shown in FIG. 2. The locking tab 202 can be raised or lowered for locking the wheel of the caster and thereby preventing the caster from rolling along a surface.

The enclosure assembly 100 of FIG. 1 also includes a second shelf 118 disposed substantially parallel with and between the top wall 114 and bottom wall 110. The second shelf 118 has a smaller cross-section than the first shelf 108, e.g., the second shelf 118 does not extend the entire width of the enclosure assembly 100, and therefore only is coupled to one of the two side walls 116. Due to this configuration, a ramp 122 can be pivotably coupled to the second shelf 118 and provide access between the bottom wall 110 and the second shelf 118. The ramp 122 can be formed of a steel wire mesh similar to the first shelf 108, or it can be a solid piece of material with a latch or hook for coupling to the second shelf 118. In another embodiment, the ramp 122 can couple to both the second shelf 118 and bottom wall 110.

As shown in FIG. 1, a bottom pan 112 can be placed on top of the bottom wall 110. Advantageously, the bottom pan 112 can rest on top of the wall 110 without being coupled thereto. Similarly, a shelf pan 120 can be disposed on top of the second shelf 118. The shelf pan 120 can be coupled to the second shelf 118 without the use of a fastener, for example, or the pan 120 can be designed to rest on top of the second shelf 118 without being coupled thereto. The second shelf 118 and shelf pan 120 will be described in further detail below.

Figure 12:
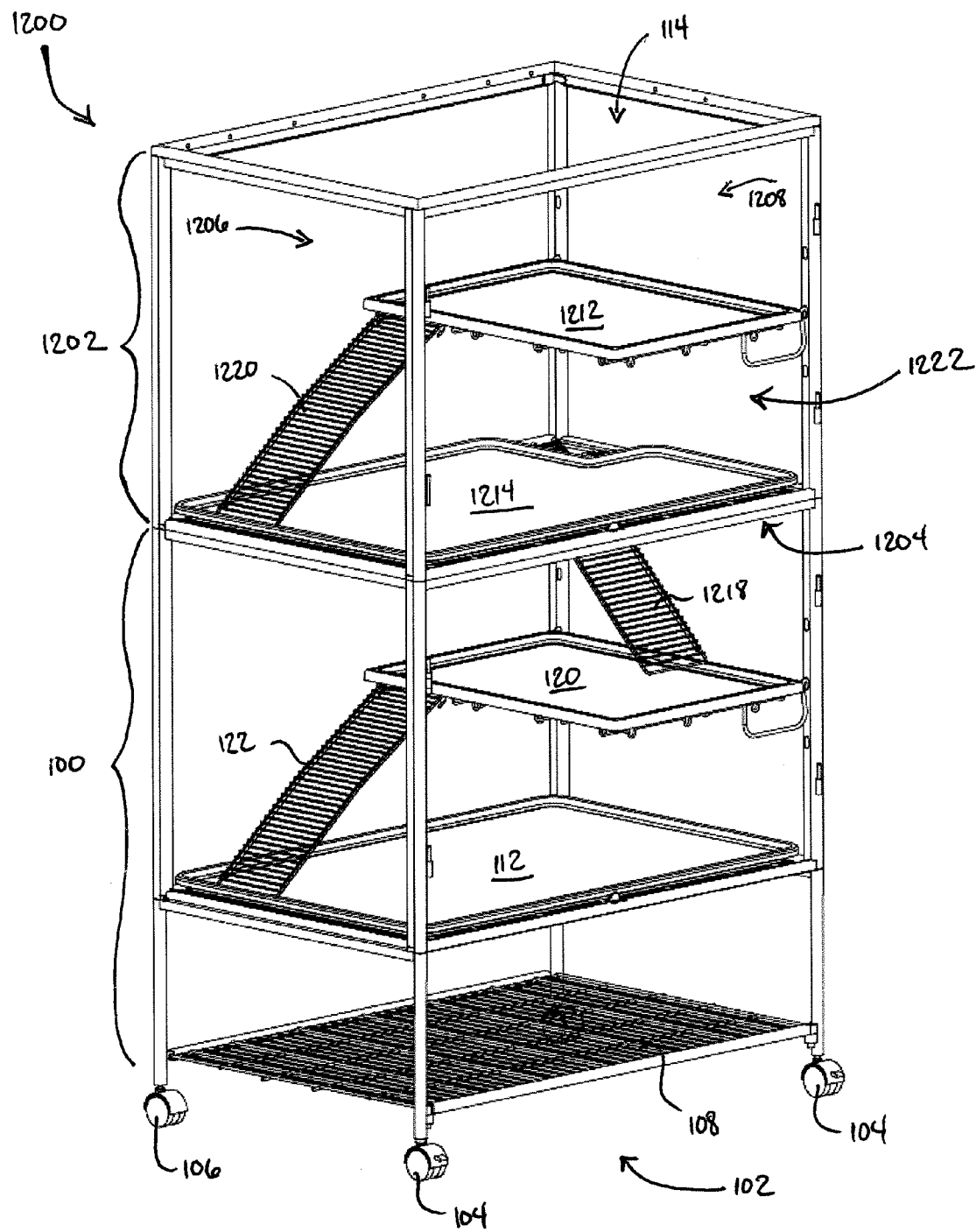
FIG. 12 is a perspective view of another embodiment of an enclosure assembly.

Although only one enclosure assembly 100 is shown in FIG. 1, multiple enclosure assemblies can be stacked vertically to form a multi-level enclosure assembly. An example of this is shown in FIG. 12 and will be further described below.

Figure 3:
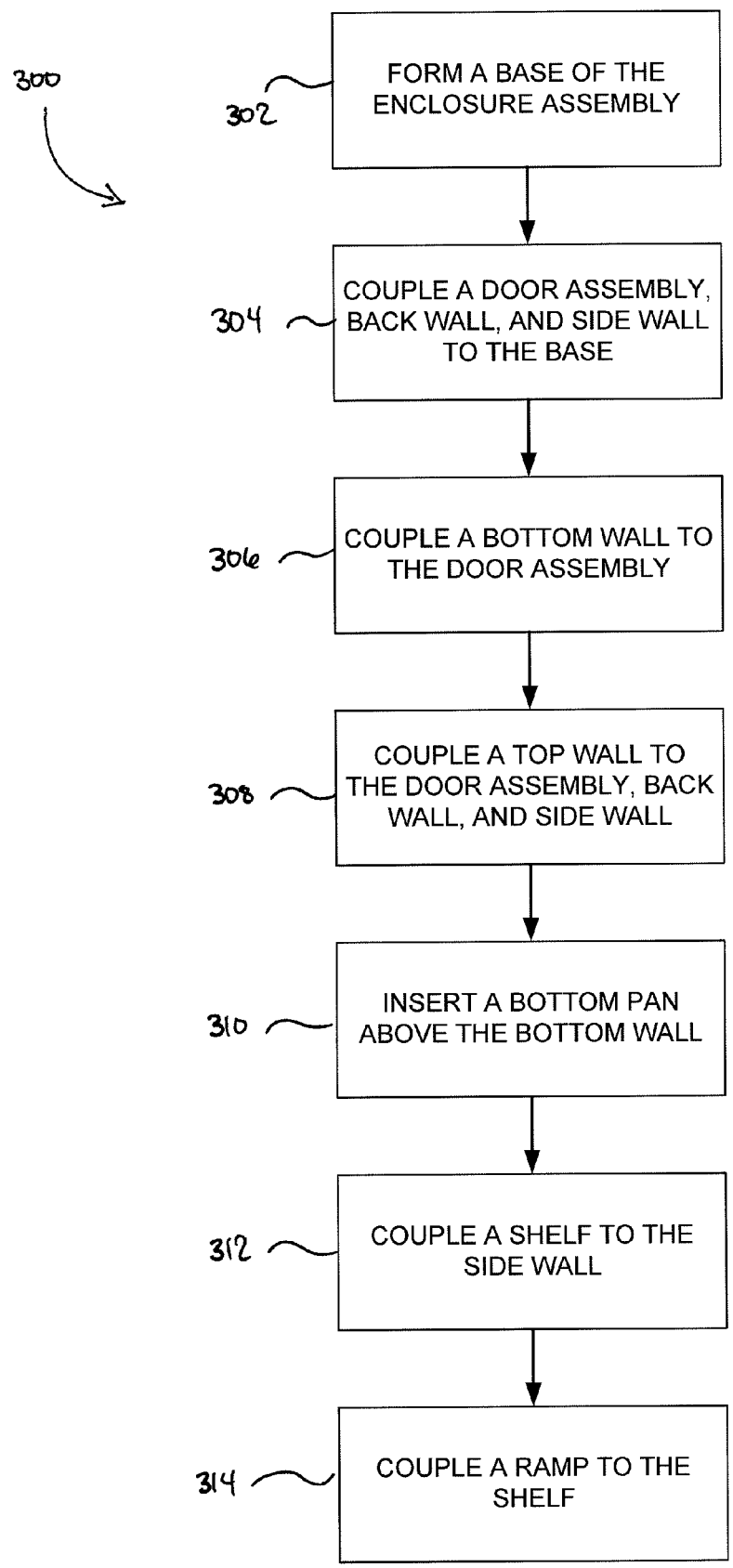
FIG. 3 is a flowchart of a method for assembling an enclosure assembly.
Figure 4:
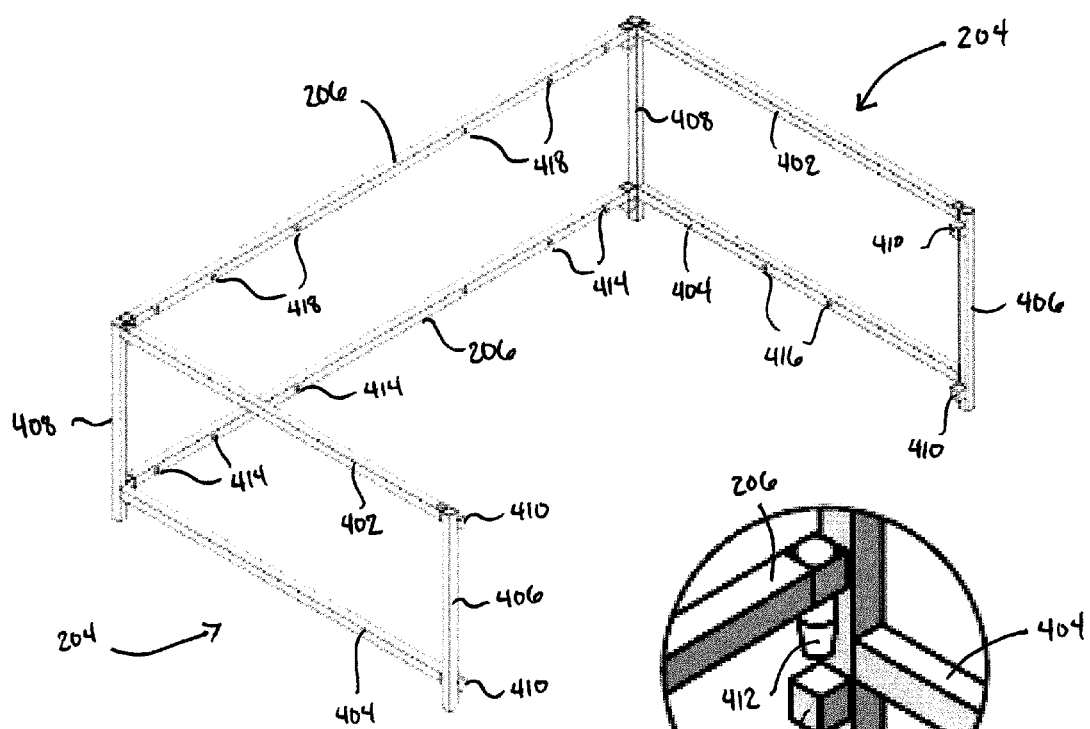
FIG. 4 is a perspective view of side supports being coupled to front supports of an enclosure assembly.
Figure 4A:
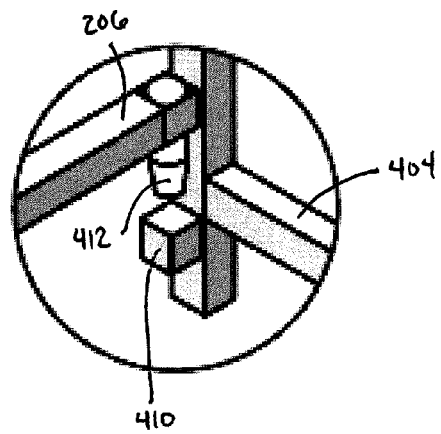
FIG. 4A is a close-up perspective view of the assembly of the side supports and front supports of FIG. 4.
Figure 4B:
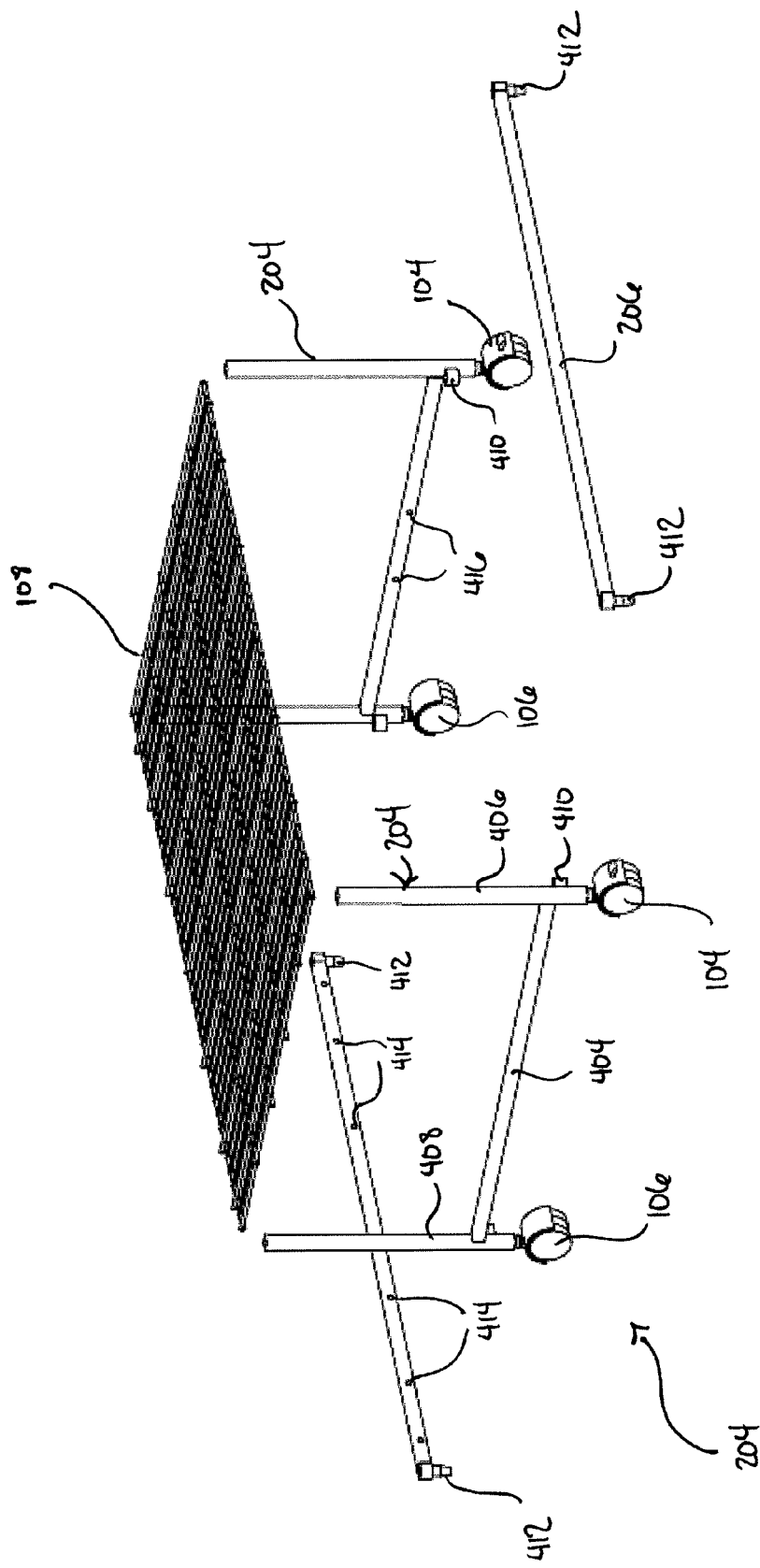
FIG. 4B is an exploded view of a base assembly.

In FIG. 3, an exemplary method 300 for assembling an enclosure assembly similar to the one shown in FIG. 1 is provided. The method 300 advantageously does not require any tools or fasteners for assembling the enclosure assembly. In block 302 of method 300, a base of the enclosure assembly is formed. To do so, a side support 204 having an upper horizontal member 402, a lower horizontal member 404, a front vertical member 406, and a back vertical member 408 is coupled to a front support 206 (although not shown in FIG. 4B, the side supports 204 do include an upper horizontal member 402). In FIGS. 4, 4A, and 4B, for example, the side support 204 includes a receptacle disposed at each corner thereof. In other words, a receptacle 410 is disposed near the corner of where the lower horizontal member 404 and front vertical member 406 join. Likewise, a receptacle 410 is provided at the corners where the upper horizontal member 402 joins both the front vertical member 406 and back vertical member 408.

The receptacle 410 can be square, circular, or any other shape. A recess or opening is defined in the receptacle for receiving a peg 412 of the front support 206 (see FIG. 4A). A peg 412 is provided at each end of the front support 206 and extends in a direction substantially perpendicular to the length of the front support 206. To couple the front support 206 to the side support 204, the peg 412 at one end of the front support 206 is pressed firmly into one of the receptacles 410 of the side support. A tool such as a hammer or rubber mallet is unnecessary for assembling the front support 206 and side support 204.

The same process is followed for assembling a second side support 204 to the opposite end of the same front support 206. Likewise, front supports 206 couple both side supports 204 at both the front and back of the base. Once assembled, the side supports 204 are oriented such that the receptacles 410 face inward. Therefore, two side supports 204 and four front supports 206 are coupled to one another and form a frame of the base in block 302.

Forming the base in block 302 can also include coupling one or more casters or wheels to the base. In one aspect, a plurality wheels can be coupled to the base. In another aspect, a plurality of locking or non-locking casters can be coupled to the base. In yet another aspect, a pair of locking casters 104 can be coupled to the front of the base and a pair of non-locking casters 106 can be coupled to the rear of the base. To do so, each of the locking casters 104 and non-locking casters 106 include a stem 210 (see FIG. 2) that extends substantially vertically therefrom. To couple, the stem 210 is firmly pressed into an opening defined in the bottom of one end of each side support 204. In one embodiment, the stem 210 snaps into the side support 204. In another embodiment, the stem 210 engages the side support 204 in a press-fit manner. A tube, sleeve, or cylindrical member (not shown) can be pressed into the opening first such that the tube or cylindrical member is disposed between the stem 210 and side support 204 when the press-fit coupling is achieved. Other means known to one skilled in the art can be used for coupling the caster or wheel to the base.

Once assembled, the base is able to roll along a surface such as the ground between locations. In the embodiment in which at least one locking caster 104 is coupled to the frame of the base, the caster 104 can include a locking tab 202 as shown in FIG. 2. The locking tab 202 can be moveable between a locking and non-locking position. For instance, if the locking tab 202 is raised to an upper position, this may unlock the caster 104 so that it is free to rotate. If the locking tab 202 is lowered to a lower position, this may lock the caster 104 so that it cannot rotate. In this orientation, the base cannot move until the locking caster 104 is unlocked. In the event more than one locking caster 104 is coupled to the base, the base is able to freely move about a surface between locations when all locking casters 104 are unlocked.

A shelf 108 can also be coupled to the base in block 302. The shelf 108 can be made of any material, but in the embodiment of FIG. 4B, it is made of steel wire mesh. The shelf 108 can include wires that extend longitudinally and transversely. In this embodiment, one or more of the longitudinal wires extend beyond the outermost transverse wires and form first protruding ends 130 (see FIG. 2). Likewise, one or more of the transverse wires extend beyond the outermost longitudinal wires and form second protruding ends 128 (see FIG. 2). As such, when coupling the shelf 108 to the base, the one or more first protruding ends 130 can be aligned with and inserted into an opening 416 (see FIG. 4) defined in the lower horizontal member 404 of the side support 204. The one or more first protruding ends 130 can be slidably received in the opening 416, or the one or more first protruding ends 130 can be snapped or press-fit into the opening 416. Similarly, the one or more second protruding ends 128 can be aligned with and coupled to one or more openings 414 (see FIG. 4) defined in the front support 206. The coupling can be achieved by snap-fit, press-fit, or any other coupling means.

In an alternative embodiment, the openings 414, 416 can instead be grooves or open-ended slots into which the first protruding ends 130 and second protruding ends 128 can be inserted. The shelf 108 can be coupled to the base in other ways known to the skilled artisan. However, and most importantly, the shelf 108 is coupled to the base without the use of tools or fasteners.

Figures 5, 5A:
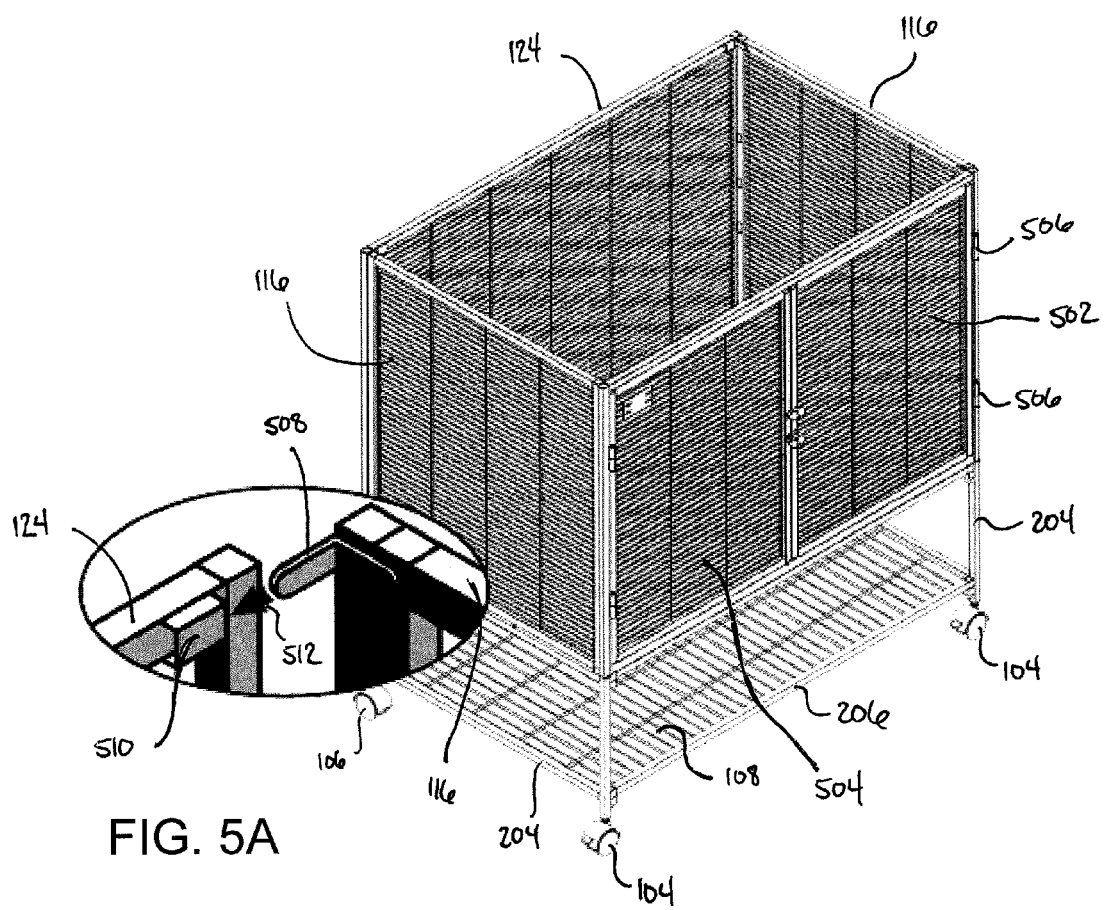
FIG. 5 is a perspective view of a side wall being coupled to a door assembly and back wall of an enclosure assembly.
FIG. 5A is a close-up perspective view of the side wall of FIG. 5 being coupled to the back wall.
Figure 11:
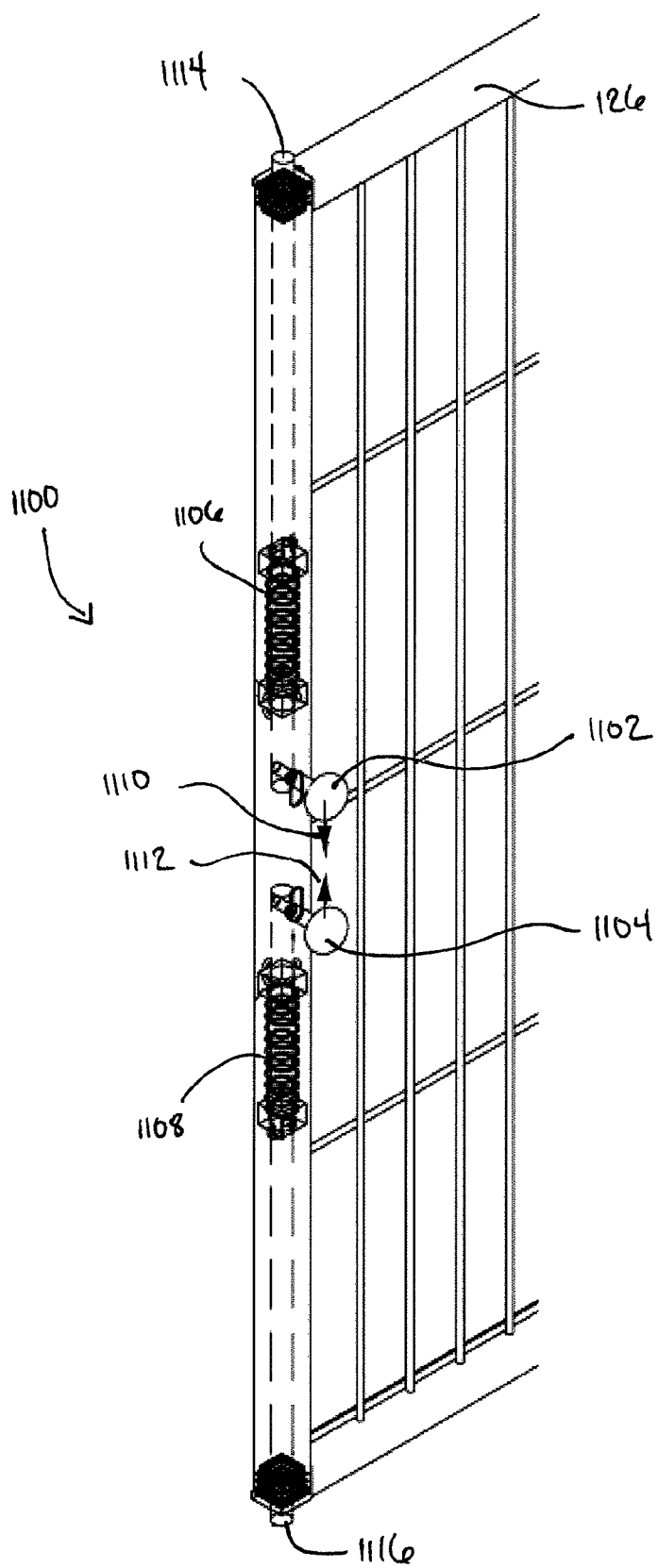
FIG. 11 is a partial schematic view of a knob assembly for a door assembly.

In block 304 of method 300, a door assembly 126 can be coupled to the base. The door assembly 126 can include one or more doors. In FIG. 5, for example, the door assembly 126 includes a first door 502 and second door 504. The first and second doors can include any mechanism for opening and/or closing the door. Likewise, the first and second doors can include any mechanism for unlocking the doors, or alternatively, the doors do not need any locking mechanism. In FIG. 5, the first door 502 and second door 504 include a first knob 1102 and second knob 1104 (see FIG. 11), respectively. Although one embodiment of unlocking and opening the doors is shown in FIG. 11 and described below, any known embodiment which includes a knob, handle, or other mechanism can be incorporated with the doors.

The door assembly 126 can comprise an outer frame with the first door 502 and second door 504 hingedly coupled thereto, as shown in FIG. 2, or the first door 502 can be separate from the second door 504 without being coupled to an outer frame. In the embodiment of FIG. 5, the door assembly 126 includes an outer frame that can be coupled to the base. Each door 502, 504 is coupled to the frame by one or more hinges 506. In order to couple the outer frame to the base, the door assembly 126 can include a plurality of pegs 430 (see FIG. 2) protruding from the frame that are similar to the peg 412 shown in FIG. 4A. The base, and more particularly, the upper horizontal member 402 of the side support 204 and front support 206 can include apertures through which the plurality of pegs 430 can be inserted. A tube or sleeve (not shown) can be inserted into the apertures such that the plurality of pegs 430 couple via a snap-fit or press-fit coupling. The plurality of pegs 430 can fit snuggly without requiring the use of a tool or fastener to hold the door assembly 126 to the base. Any other means including using an adhesive to couple the door assembly 126 to the base can be used. Regardless of how the door assembly 126 is coupled to the base, no tools or fasteners are required to complete the assembly process.

In block 304, a back wall 124 can also be coupled to the base without the use of tools or fasteners. The back wall 124, as described with reference to FIG. 2, can be made of steel wire mesh. The steel wire mesh can include longitudinally extending wires and transversely extending wires. The steel wire mesh can be confined within an outer frame 132 (see FIG. 2). The outer frame 132 can include a bottom section 134 (see FIG. 2) which defines a plurality of openings along an inner face. The back wall 124 can also include a plurality of pegs 432 (see FIG. 2) similar to the plurality of pegs described above with reference to the door assembly 126. The back wall 124 can be coupled to the base in the same manner therefore as the door assembly 126 is coupled to the base. The plurality of pegs 432 of the back wall 124 can be inserted into corresponding apertures defined in the front support 206 and/or side support 204. In one embodiment, the back wall 124 can include a peg 432 at one corner thereof and another peg 432 at an opposite corner thereof. In this embodiment, both pegs 432 are oriented in the same direction such that both pegs 432 can be inserted into corresponding openings in the base. The plurality of pegs 432 can be snap-fit, press-fit, glued, or coupled in the openings by any manner without the use of a tool or fastener.

A side wall 116 can also be coupled to the base in block 304. Once coupled, the side wall 116 is disposed between the door assembly 126 and back wall 124. Similar to the door assembly 126 and back wall 124, the side wall 116 can include a plurality of pegs 434 (see FIG. 2) that can be inserted through openings defined in the base (e.g., the side support 204 and/or front support 206). In addition, the side wall 116 can be coupled to the door assembly 126 and back wall 124. To do so, the side wall 116 can include a plurality of tabs 508 as shown in FIG. 5A. The plurality of tabs 508 can be made of steel, aluminum, or any other material. The tabs 508 can have a substantially right-angular shape such that a first portion of the tab 508 is coupled or adhered to a corner of the side wall 116 and a second portion that extends substantially perpendicular to the first portion. The door assembly 126 and back wall 124 can each include a slot or sleeve 510 for receiving the tab 508 of the side wall 116. In one embodiment, the side wall 116 includes a tab 508 disposed at each corner thereof for being received within a corresponding slot or sleeve 510 formed in the door assembly 126 or back wall 124. The tab 508 can be snapped, press-fit, or coupled in any other manner to the slot or sleeve 510. In any event, no tools or fasteners are required for assembling the side wall 116 to either the door assembly 126 or back wall 124.

In FIG. 1, the enclosure assembly 100 includes a pair of side walls 116, each of which is oppositely disposed from the other. In this embodiment, the door assembly 126, back wall 124, and pair of side walls 116 form a four-sided enclosure. In another embodiment, the enclosure assembly can include three sides such that only one side wall 116 is provided. In other embodiments, the enclosure assembly can include five or more sides, and therefore more than one side wall 116 is required for the assembly. In any event, the method of coupling the side wall 116 to the door assembly 126 and back wall 124 is the same.

In block 306 of method 300, a floor surface or bottom wall 110 is coupled to the door assembly 126. Block 306 can be performed before block 304 is completed. For example, after the door assembly 126 is coupled to the base in block 304, but before either the side wall 116 or back wall 124 are coupled to the frame and/or to each other, the bottom wall 110 can be coupled to the door assembly 126. The bottom wall 110 can be made of any material, but in the embodiment of FIGS. 1 and 2 the bottom wall 110 is made of steel wire mesh. In this embodiment, the steel wire mesh can include wires that extend longitudinally and traversely. When assembling or coupling the bottom wall 110 to the door assembly 126, the transversely extending wires (e.g., the wires that extend in a direction from front to back of the enclosure assembly) of the bottom wall 110 should be disposed above the longitudinally extending wires (e.g., the wires that extend in a direction between the pair of side walls 116). In different embodiments, the orientation of the wires may not matter such that the transversely extending wires may be beneath the longitudinally extending wires.

The transversely extending wires of the bottom wall 110 can extend past the outer longitudinally extending wires and form protruding ends similar to the first and second protruding ends 128, 130 of the shelf 108. The protruding ends of the transversely extending wires of the bottom wall 110 can be inserted into apertures or the like defined in the frame of the door assembly 126. Similarly, at the opposite end of the bottom wall 110 (e.g., near the back wall 124), the protruding ends can be inserted into apertures or the like defined in the frame 132 of the back wall 124. In particular, the bottom section 134 of the frame 132 includes corresponding apertures for receiving the protruding ends of the bottom wall 110, thereby allowing the bottom wall 110 to properly align with the door assembly 126 and back wall 124.

The longitudinally extending wires of the bottom wall 110 can also form protruding ends that extend past the outermost transversely extending wires. The protruding ends are similar to the protruding ends 128, 130 described above with respect to the shelf 108. The protruding ends of the longitudinally extending wires can be inserted into corresponding apertures defined in the side wall 116. As such, the bottom wall 110 is properly aligned with the side wall 116, or in the embodiment of FIG. 1, for example, the bottom wall 110 is aligned with both side walls 116.

As described above, the protruding ends of the longitudinally and transversely extending wires of the bottom wall 110 are inserted into corresponding apertures defined in the door assembly 126, back wall 124, and side wall 116. This, however, is not the only manner by which the bottom wall 110 can be coupled thereto. In a different embodiment, instead of apertures, the door assembly 126, back wall 124, and side wall 116 can include corresponding grooves through which the protruding ends can engage. The engagement can be snap-fit, tongue-in-groove, press-fit, or any other form of coupling known to the skilled artisan. A skilled artisan can appreciate other means for coupling the bottom wall 110 to the door assembly 126, back wall 124, and side wall 116; however, no tools or fasteners are required to complete step 306.

While in the previously described embodiment the bottom wall 110 is coupled to the door assembly 126, back wall 124, and side wall 116, in other embodiments the bottom wall 110 can be coupled to the base (e.g., the side support 204 or front support 206). The bottom wall 110 can also include a bottom pan 112 as shown in FIGS. 1 and 2. In block 310, the bottom pan 112 can be coupled to the bottom wall 110 in a plurality of ways, or the bottom pan 112 can rest on top of the bottom wall 110 without being coupled thereto. The bottom pan 112 can have a substantially planar upper surface (i.e., when assembled, the upper surface faces a direction opposite the base). Alternatively, the bottom pan 112 can have an outer rim that is raised from the interior of the pan 112. In other words, the bottom pan 112 can have a recessed or bowl-like shape.

Figures 6, 6A:
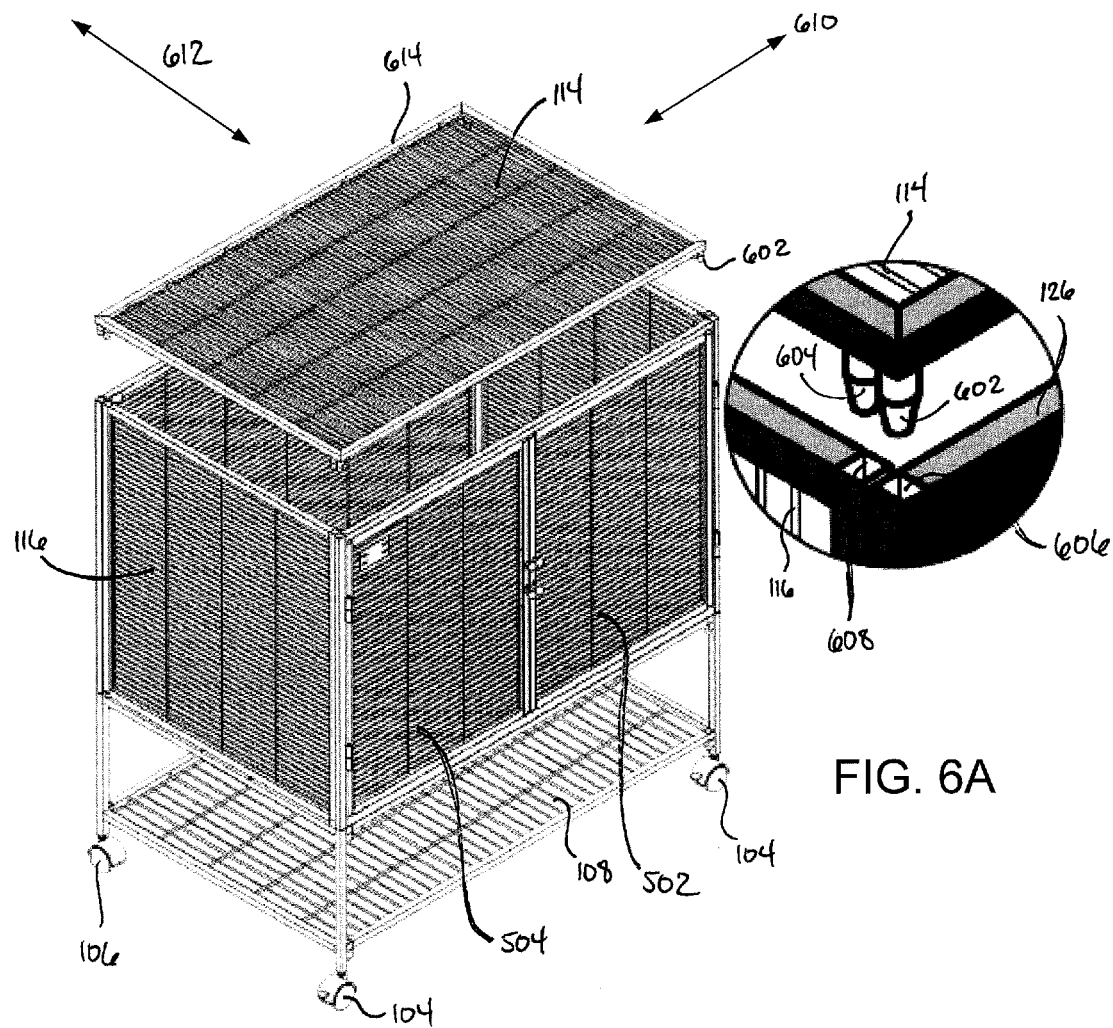
FIG. 6 is a perspective view of a top wall being coupled to the back wall, door assembly, and side wall of FIG. 5.
FIG. 6A is a close-up perspective view of the top wall being coupled to the side wall and door assembly of FIG. 6.

In block 308 of the method 300 for assembling an enclosure assembly, a top wall 114 can be coupled to the door assembly 126, back wall 124, and side wall 116. With reference to FIGS. 6 and 6A, the top wall 114 is made of steel wire mesh similar to the previously-described walls that form the enclosure assembly. In other embodiments, however, other materials can form the top wall 114. In the present embodiment, the wire mesh is formed by longitudinally extending wires that run in the direction indicated by arrow 610 and transversely extending wires that run in the direction indicated by arrow 612. The wires are enclosed within an outer frame 614. The outer frame 614 can include a plurality of pegs 602, 604 for coupling the top wall 114 to the door assembly 126, back wall 124, and side wall 116. In FIG. 6A, for example, peg 602 protrudes outward from the frame 614 and is received by an opening 606 in the door assembly 126. Likewise, peg 604 is received by a corresponding opening 608 defined in the side wall 116. The engagement of the pegs 602, 604 in the respective openings can be snap-fit, press-fit, or by any other known engaging means. Advantageously, the pegs 602, 604 can be manually pushed into the corresponding openings without requiring tools or fasteners.

Figures 7, 7A:
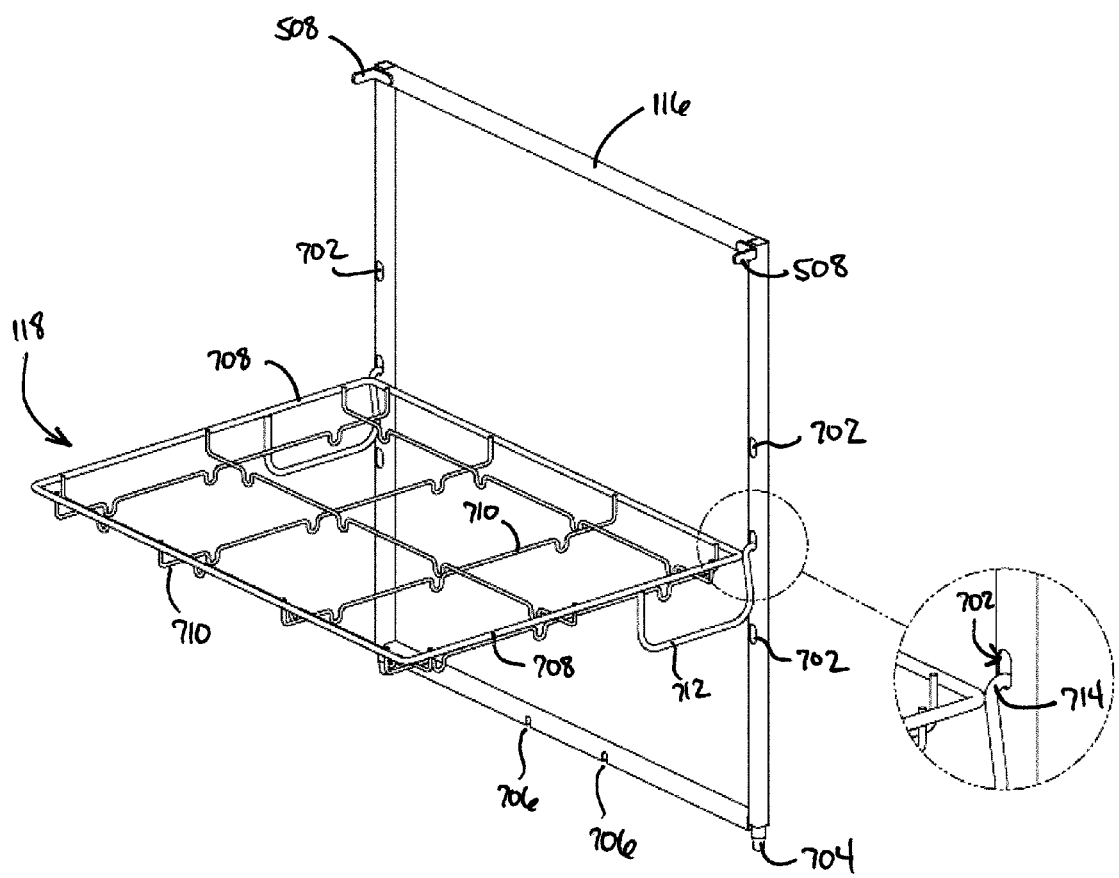
FIG. 7 is a perspective view of a shelf being coupled to a side wall of an enclosure assembly.
FIG. 7A is a close-up perspective view of a hook of the shelf being inserted into an opening defined in the side wall of FIG. 7.

In block 312, a shelf assembly 908 can be coupled to the side wall 116 or back wall 124 of the enclosure assembly. In the embodiment shown in FIGS. 7-9, a wire shelf 118 is coupled to the side wall 116. The shelf 118 comprises at least one outer support wire 708 and a plurality of undercarriage wires 710. The shelf 118 can further include a U-shaped member 712 having a hook 714 disposed at one end thereof. The side wall 116 can have a plurality of apertures 702 defined vertically along an inner face thereof. The plurality of apertures 702 are sized for receiving the hook 714 of the shelf 118, such that when the hook 714 engages an aperture, the shelf 118 is coupled to the side wall 116. The shelf 118 can be vertically positioned along the side wall 116 by coupling the hook 714 with an aperture 702 at the desired position.

Although described above, the side wall 116 in FIG. 7 includes a pair of tabs 508, a pair of pegs 704 for coupling to the base, and a plurality of apertures or grooves 706 defined therein for coupling to the bottom wall 110. The apertures or grooves 706 can be aligned with protruding ends of longitudinally extending wires of the bottom wall 110 to assist with proper assembly of the enclosure assembly.

Figure 8:
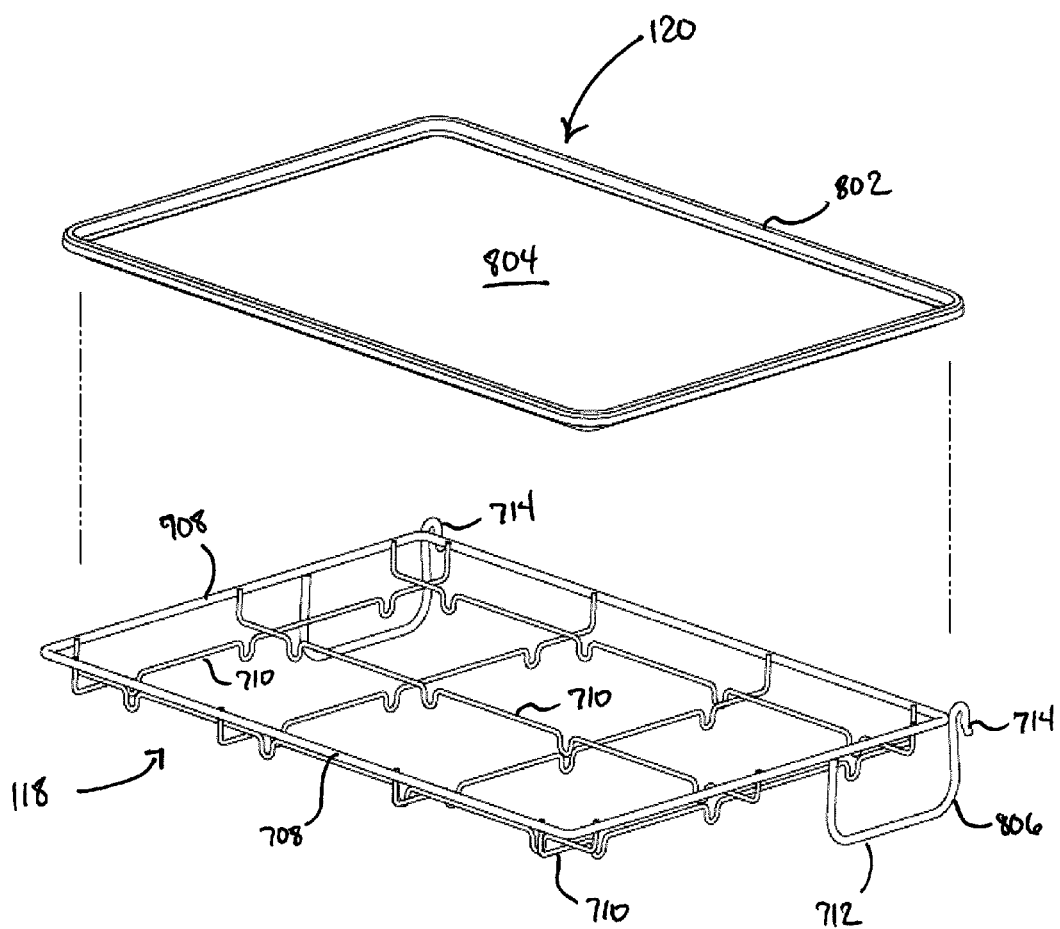
FIG. 8 is an exploded view of a shelf assembly.

In FIG. 8, the shelf 118 can support a shelf pan 120. The combination of the shelf 118 and pan 120 comprise a novel design in which the outer support wire 708 and undercarriage wires 710 form a recessed framework upon which the pan 120 rests. The pan 120 includes an outer portion 802 that is raised from an inner portion 804. The pan 120 can have a rectangular, circular, square, or other cross-sectional shape, but the inner portion 804 is recessed from the outer portion 802. As such, the undercarriage wires 710 forms a framework for supporting the inner portion 804 of the pan and the outer support wire 708 can support the outer portion 802 of the pan 120. Any liquid that collects on the inner portion 804 of the pan 120 cannot leak or flow beyond the outer portion 802 thereof. Thus, the entire enclosure assembly 100 becomes easier to clean.

The U-shaped member 712 of the shelf 118 can also include a curved surface 806 such that as the hook 714 is disposed in one of the apertures 702, the curved surface 806 engages the inner face of the side wall 116 (e.g., the same inner face in which the plurality of apertures 702 are defined). Therefore, when the hook 714 is coupled to the aperture 702 and the curved surface 806 engages the side wall 116, the shelf 118 is maintained in a substantially horizontal position even when the pan 120 is supported by the shelf 118.

Figures 9, 9A:
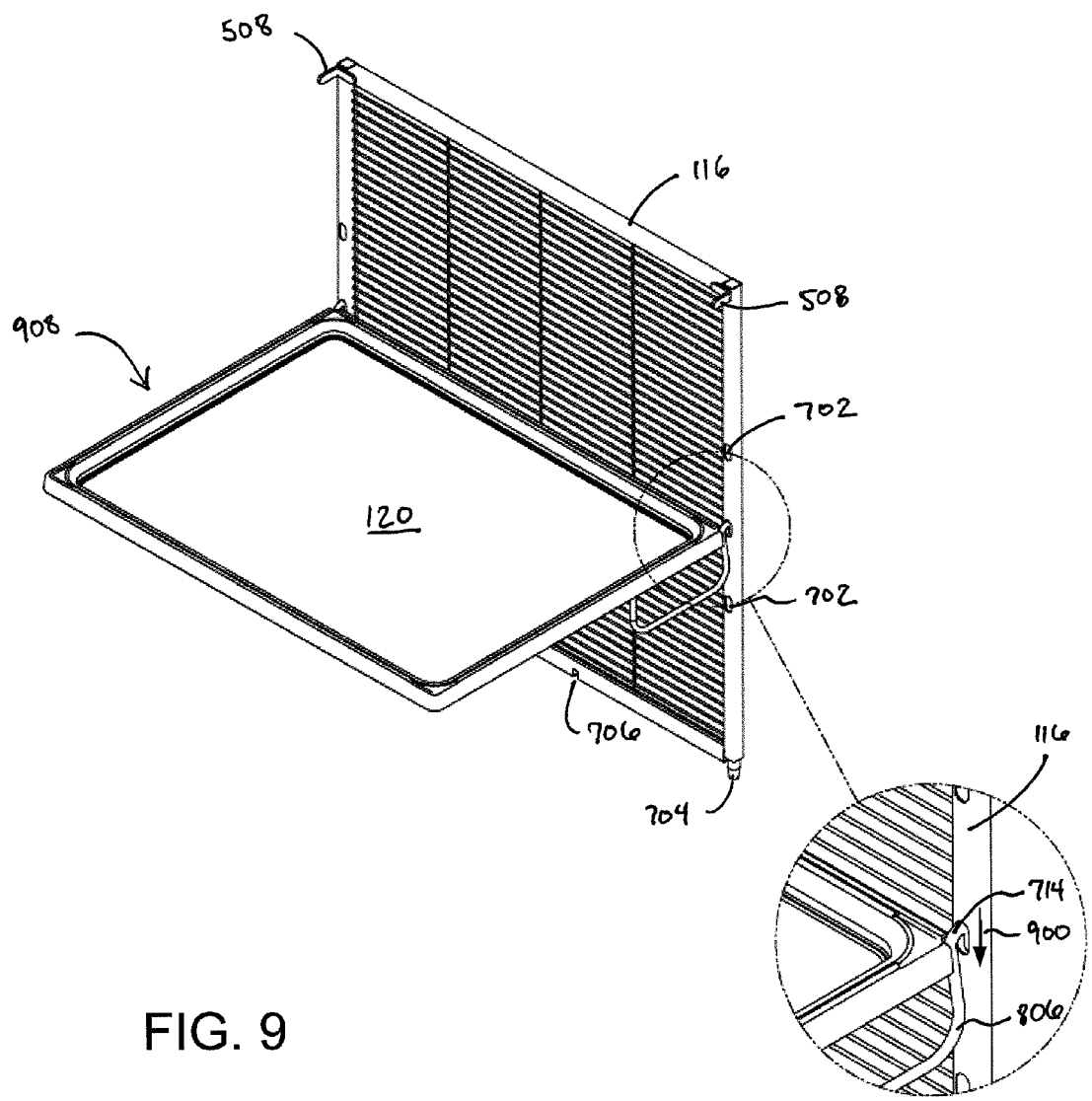
FIG. 9 is a perspective view of the shelf assembly of FIG. 8 being coupled to a side wall.
FIG. 9A is a close-up perspective view of the shelf assembly being coupled to the side wall of FIG. 9.

In the embodiment of FIG. 9, the shelf 118 and pan 120 form a shelf assembly 908. The shelf assembly 908 in FIG. 9 is distinguishable from the shelf assembly 208 of FIG. 2. In particular, the shelf assembly 908 includes the undercarriage wires 710 and outer support wire 708 such that the pan 120 rests inside the framework. In contrast, the shelf assembly 208 of FIG. 2 includes a planar shelf pan (unlike the bowl-like or recessed pan 120 described and shown in FIG. 8).

In FIG. 9, the pan 120 can be removably coupled to the shelf 118 and thus form the shelf assembly 908. As such, the shelf assembly 908 can be coupled to the side wall 116 similar to the embodiment of FIG. 7. In FIG. 9A, the hook 714 disposed at one end of the U-shaped member 712 of the shelf 118 is inserted into one of the apertures 702 of the side wall 116. Sliding the hook 714 along the direction indicated by arrow 900 couples the shelf assembly 908 to the side wall 116. The curved surface 806 of the U-shaped member 712 contacts the inner face of the side wall 116 to maintain the shelf assembly 908 in a substantially horizontal orientation.

Figures 10, 10A:
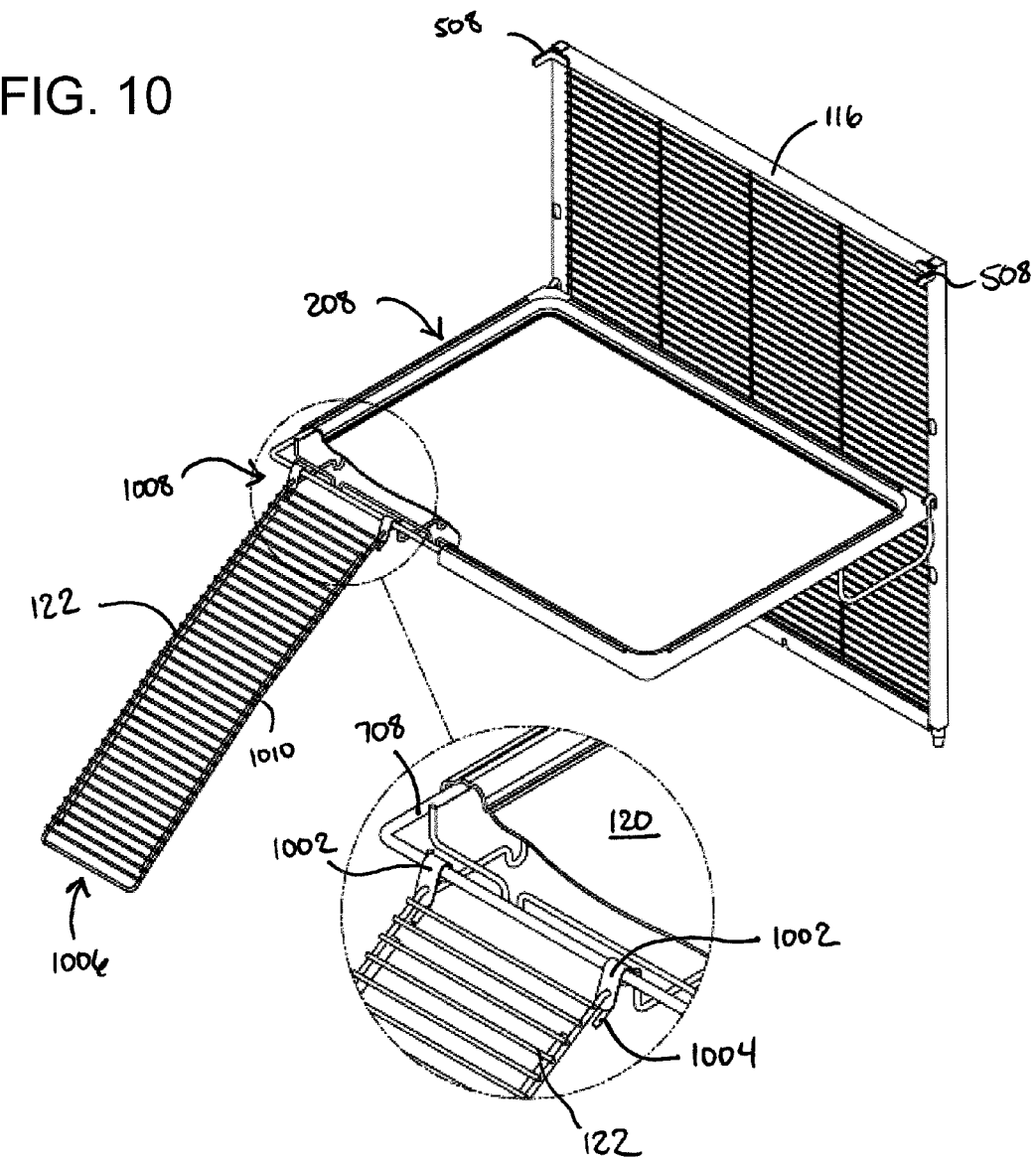
FIG. 10 is a perspective view of a ramp being coupled to the shelf assembly of FIG. 8.
FIG. 10A is a close-up perspective view of the ramp of FIG. 10 being coupled to the shelf assembly.

In block 314 of method 300, once the shelf 118 or shelf assembly 908 is coupled to the side wall 116 (or, in other embodiments, the back wall 124), a ramp or ladder 122 is coupled to the shelf 118. With reference to FIGS. 10 and 10A, the ramp 122 can be made steel wire mesh. In other embodiments, however, the ramp 122 can be made of other materials. The ramp 122 can be substantially planar from a first end 1006 to a second end 1008, or as shown in FIG. 10, the ramp 122 can comprise a bend 1010 approximately near the middle thereof. The bend 1010 can be less than 10°, and in some embodiments, the bend is less than 5°.

At or near the second end 1008 of the ramp 122 is one or more hooks 1004. In the embodiment of FIG. 10A, the shelf 118 can comprise a pair of tabs 1002 which include an opening defined therein. The opening is sized such that the hooks 1004 can fit into the openings for coupling the ramp 122 to the shelf 118. The engagement of the hooks 1004 with the tabs 1002 is such that the ramp 122 can pivot about the shelf 118. This can be important if, for example, there is a need for holding the ramp 122 in a raised position (e.g., maintain or prevent an enclosed animal from ascending or descending the ramp 122). Although not shown, the first end 1006 of the ramp 122 may include a hook, latch, or the like that can couple to an opposing side wall 116. In the lowered position, the first end 1006 of the ramp 122 can rest against the bottom wall 110 or bottom pan 112.

With reference to FIG. 11, an exemplary embodiment of a latching assembly 1100 is shown. The latching assembly 1100 can be incorporated in both the first door 502 and second door 504 of FIG. 5. In FIG. 11, the latching assembly 1100 can include a first knob 1102 and a second knob 1104. The first knob 1102 is disposed above the second knob 1104, and both knobs can be moveable about a vertical axis (not shown). The latching assembly 1100 also includes a first pin 1114 and a second pin 1116. A first spring 1106 is disposed between the first knob 1102 and first pin 1114, and a second spring 1108 is disposed between the second knob 1104 and second pin 1116. The first and second pins are disposed at one end of a tube or rod. Likewise, the first and second knobs are disposed at one of a different tube or rod.

When a door is in a closed position, i.e., the door prevents access to the interior of the enclosure assembly, the first pin 1114 and second pin 1116 are fully extended away from one another and engaged in openings formed in a frame of the door assembly 126. The door cannot be opened by pulling it open. Instead, the first knob 1102 is moved along the direction indicated by arrow 1110 and the second knob 1104 is moved along the direction indicated by arrow 1112 such that springs 1106 and 1108 are extended and pins 1114, 1116 are released from the engaged position. In FIG. 11, the knobs 1102, 1104 are pressed toward one another to release the door, but in other embodiments it is possible for the knobs to be moved away from one another for releasing engagement. One skilled in the art can appreciate other ways in which a door can be latched and unlatched.

Turning now to FIG. 12, a different embodiment of an enclosure assembly is illustrated. In this embodiment, a multiple enclosure assembly 1200 is provided. The multiple enclosure assembly 1200 includes a first enclosure assembly 100 and a second enclosure assembly 1202. The second enclosure assembly 1202 is disposed above the first enclosure assembly 100. The first enclosure assembly 100 can be assembled in accordance with method 300. However, the top wall 114 is disposed on top of the second enclosure assembly 1202 rather than the first assembly 100.

Figure 13:
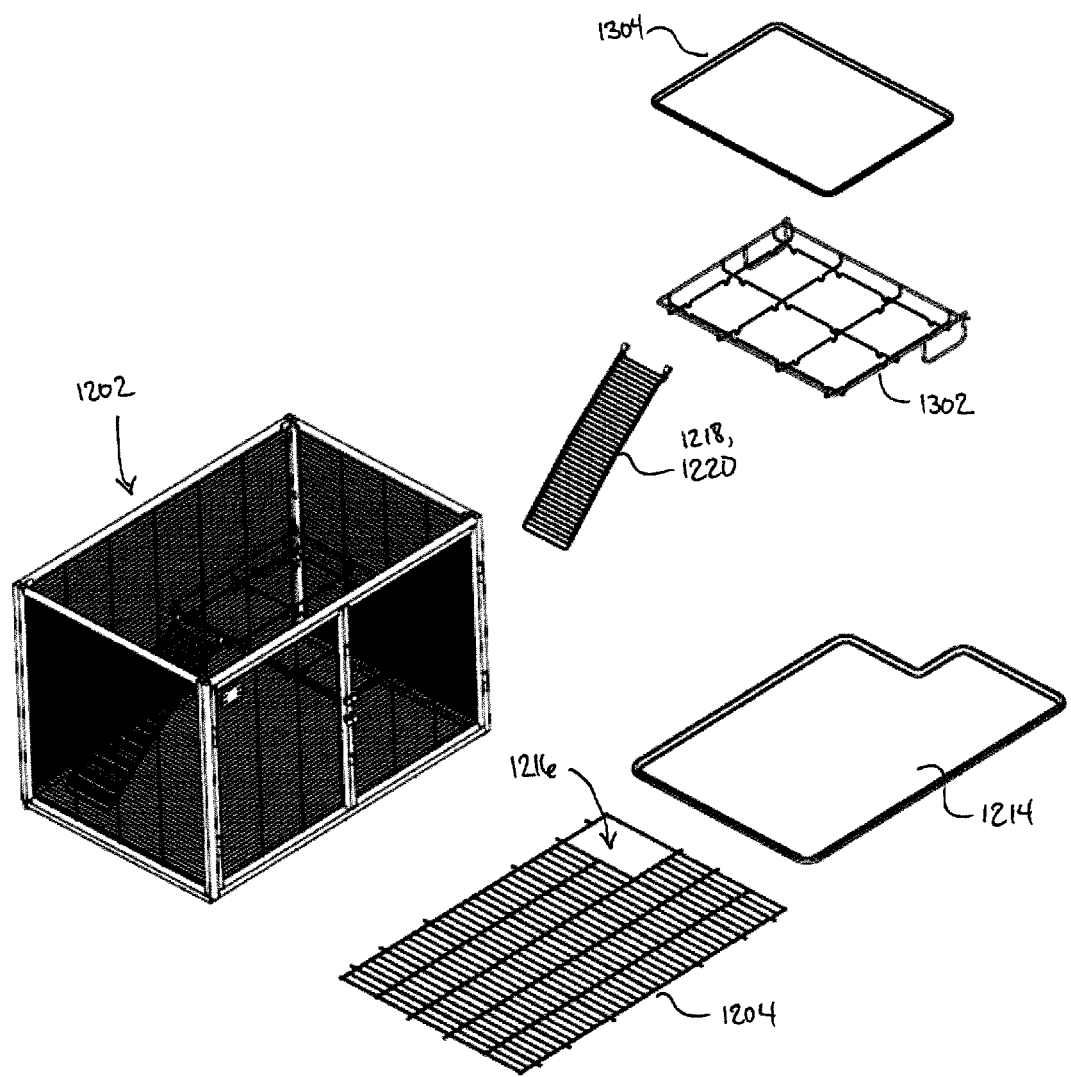
FIG. 13 is a partial exploded and perspective view of a second enclosure assembly.

The first enclosure assembly 100 is separated from the second enclosure assembly 1202 by an intermediate wall 1204. The intermediate wall 1204 can be made of steel wire mesh or any other known material. As shown in FIG. 13, the intermediate wall 1204 can include a cutout portion 1216 defined therein. As such, an animal enclosed within the multiple enclosure assembly 1200 can traverse from the first enclosure assembly 100 to the second closure assembly 1202 through the cutout portion 1216. The intermediate wall 1204 can also include protruding ends similar to the protruding ends of the top wall 114. These protruding ends of the intermediate wall 1204 can be aligned with and coupled to apertures defined in the side wall 116, door assembly 126, and back wall 124. In an alternative embodiment, the intermediate wall 1204 can be coupled to the side wall 116, door assembly 126, and back wall 124 in the same manner as described above with respect to the top wall 114.

A pan 1214, as shown in FIG. 13, can be disposed above the intermediate wall 1204. The pan 1214 can include a corresponding cutout portion that is aligned with the cutout portion 1216 of the intermediate wall 1204. In addition, a ramp or ladder 1218 similar to ramp 122 described above can be disposed between the shelf pan 120 and intermediate wall 1204. The ramp 1218 can be made of steel wire mesh and be coupled to the intermediate wall 1204 in the same manner by which the ramp 122 is coupled to the shelf 118 (e.g., via one or more hooks).

The method of assembling the second enclosure assembly 1202 is similar to method 300 described above. While blocks 302 and 304 are not performed, a door assembly 1222 similar to the one shown in FIG. 1 is coupled to the intermediate wall 1204 in a similar manner as the bottom wall 110 and door assembly 126 are coupled. Likewise, a back wall 1206 and at least one side wall 1208 are coupled to the door assembly 1222 and intermediate wall assembly 1204. Once the door assembly 1222, back wall 1206, and at least one side wall 1208 are coupled to one another and to the intermediate wall 1204, the top wall 114 can be coupled thereto as well. Again, the pegs 602, 604 can be inserted into corresponding openings defined in the door assembly 1222, side wall 1208, and back wall 1206.

Figure 14:
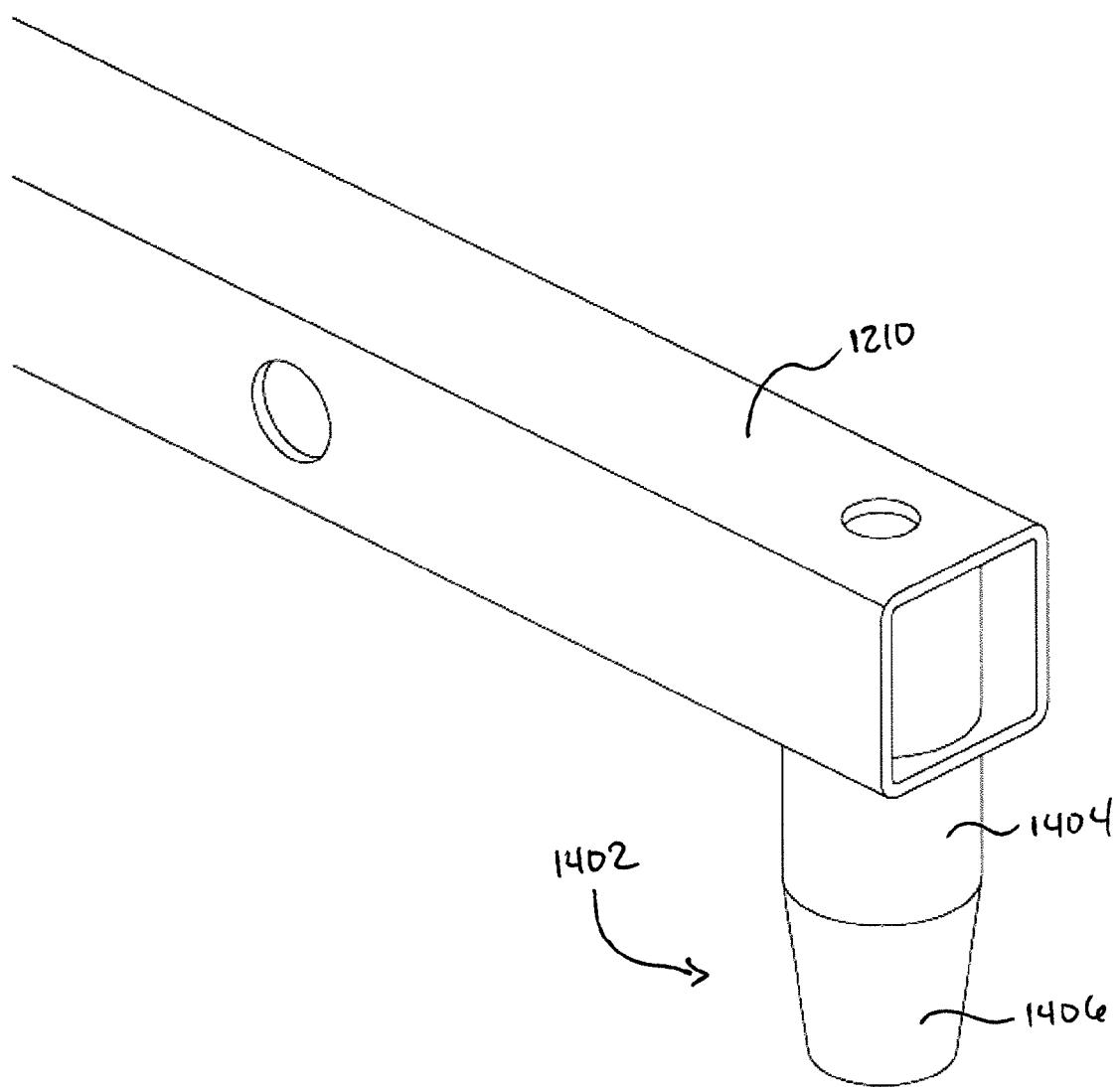
FIG. 14 is a partial perspective view of a top wall having a peg.

In FIG. 14, a peg 1402 similar to pegs 602 and 604 is shown. Peg 1402 comprises a cylindrical portion 1404 that protrudes from frame member 1210 and a conical portion 1406. For a press-fit coupling, the conical portion 1406 can be inserted into an opening or aperture as described above. The diameter of the opening or aperture is such that as the peg 1402 is pressed further therein, a snug fit or engagement is formed between the peg 1402 and the opening or aperture.

Returning to FIG. 12, the second enclosure assembly 1202 can further include a shelf assembly 1212 coupled to the side wall 1208 or back wall 1206. The shelf assembly 1212 can comprise a wire mesh shelf 1302 and pan 1304 (see FIG. 13). The shelf 1302 can be similar in design and shape as shelf 118. Likewise, the pan 1304 can be similar in design and shape as pan 120. Together, the shelf assembly 1212 can couple to the side wall 1208 or back wall 1206 in the same manner as shelf assembly 908 couples to the side wall 116 or back wall 124 of the first enclosure assembly 100. A ramp or ladder 1220 can be disposed between the shelf assembly 1212 and intermediate wall 1204. One end of the ramp 1220 can have one or more hooks that engages a wire of the shelf 1302. The ramp 1220 can be pivotably coupled to the shelf 1302 in this manner. In addition, the opposite end of the ramp 1220 which contacts the intermediate wall 1204 can be pivoted to a raised position and couple to another side wall 1208.

In the multiple enclosure assembly 1200 of FIG. 12, an animal can move about the enclosure from the bottom wall 110 to the shelf 118 by ascending ramp 122. The animal can move from the shelf 118 to the intermediate wall 1204 by ascending ramp 1218. To do so, the animal will pass through the cutout portion 1216 defined in the intermediate wall 1204. Lastly, the animal can move to shelf assembly 1212 by ascending ramp 1220.

One advantage of the multiple enclosure assembly 1200 is the ability to separate the first enclosure assembly 100 from the second enclosure assembly 1202. This can be useful when cleaning either assembly, or if more than one animal is enclosed in the entire assembly 1200, one or more animals can be separated from the other animals. To achieve this separation, the ramp 1218 can be coupled at both ends to the intermediate wall 1204. In other words, both ends of ramp 1218 can be hooked or latched to the intermediate wall 1204 and thereby block the cutout portion 1216. Therefore, an animal is prevented from climbing along the side wall 1208 or back wall 1206 through the cutout portion 1216. Alternatively, under circumstances where an animal is unable to climb along the side wall 1208 or back wall 1206, either or both ramp 122 and 1218 can be removed from the multiple enclosure assembly 1200.

Another advantage of the multiple enclosure assembly 1200 is that no tools or fasteners (screws, bolts, nuts, washers, nails, etc.) are required for assembly. Instead, the tools-free assembly makes it convenient and easy to assemble the multiple enclosure assembly 1200 without the inconvenience that comes with using tools or being without the correct quantity of fasteners. In addition, while the multiple enclosure assembly 1200 of FIG. 12 shows a first and second enclosure assembly, it is possible in other embodiments to stack additional enclosure assemblies. For example, in a pet store or zoo, two or more enclosure assemblies can be coupled together, whereby one or more intermediate walls 1204 separate the two or more enclosure assemblies.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of forming an enclosure assembly, comprising:
   (a) forming a base of the enclosure assembly from a first side support, a second side support, a front support, and a plurality of casters;
   (b) forming a first assembly having a first door assembly, a first back wall, and a first side wall;
   (c) aligning a plurality of protruding wires of a bottom wall with a plurality of openings defined in the first door assembly and first back wall;
   (d) coupling an intermediate wall to the first assembly, the intermediate wall having a cutout portion defined therein, wherein the intermediate wall is disposed substantially parallel to the bottom wall;
   (e) forming a second assembly having a second door assembly, a second back wall, and a second side wall;
   (f) coupling a top wall to the second door assembly, the second back wall, and the second side wall;
   (g) coupling the second assembly to the first assembly such that the first assembly is disposed beneath the second assembly;
   (h) coupling a first shelf assembly to the first back wall or first side wall and a second shelf assembly to the second back wall or second side wall; and
   (i) pivotably coupling a ramp to one of the first shelf assembly, the intermediate wall, and the second shelf assembly;
   wherein, steps (a)-(i) are completed without the use of a tool or fastener;
   further wherein step (a) comprises:
   orienting the first side support having a plurality of receptacles such that the plurality of receptacles face inward;
   pressing a peg disposed at one end of the front support into one of the plurality of receptacles of the first side support;
   orienting the second side support having a plurality of receptacles such that the plurality of receptacles faces the first side support; and
   pressing a peg disposed at the opposite end of the front support into one of the plurality of receptacles of the second side support.

2. A method of forming an enclosure assembly, comprising:
   providing a side support and at least two front supports, the side support having a receptacle with a defined opening disposed in each corner and the at least two front supports having a peg protruding from each end thereof;
   forming a base by inserting the pegs at each end of the at least two front supports into the receptacles of the side support;
   providing a door assembly and a back wall each having a plurality of pegs protruding from the bottom surface and a plurality of sleeves disposed near the top surface thereof;
   coupling the door assembly and back wall to the base by inserting the plurality of pegs of the door assembly and back wall with corresponding apertures defined in the top surface of the side support;
   coupling a bottom wall to the door assembly and back wall by inserting a plurality of protruding wires from the bottom wall into a plurality of openings defined in the door assembly and back wall;
   providing a side wall and a top wall, the side wall having a plurality of tabs and pegs extending therefrom and the top wall having a plurality of pegs protruding outward therefrom;
   coupling the side wall to the base by inserting the plurality of pegs from the side wall into corresponding apertures defined in the top surface of the side support;
   coupling the plurality of tabs of the side wall with the plurality of sleeves of the door assembly and back wall;
   coupling the top wall to the door assembly, side wall, and back wall by inserting the plurality of pegs protruding from the top wall into corresponding apertures defined in the door assembly, side wall, and back wall;
   coupling a shelf assembly to the side wall or back wall;
   pivotably coupling a ramp to the shelf assembly by inserting a hook of one of the ramp or shelf assembly into openings defined in the other of the ramp or shelf assembly, whereby one end of the ramp is coupled to the shelf assembly and an opposite end contacts the bottom wall; and
   forming the enclosure assembly without the use of a tool or fastener.

3. The method of claim 2, further comprising coupling a second shelf assembly to the base.

4. The method of claim 3, further comprising inserting protruding wires of the second shelf assembly with apertures defined in the base.

5. The method of claim 2, wherein the forming a base comprises:
   (a) orienting a first side support such that the receptacle at each corner thereof faces inward;
   (b) inserting the peg at one end of a first front support into one receptacle of the first side support;
   (c) orienting a second side support such that the receptacle at each corner thereof faces inward;
   (d) inserting the peg at the other end of the first front support into one receptacle of the second side support; and
   (e) repeat steps (a)-(d) for a second front support.

6. The method of claim 2, further comprising coupling a plurality of casters to the base.

7. The method of claim 6, wherein the coupling step comprises press-fitting the plurality of casters to the side support.

8. The method of claim 2, wherein coupling the side wall comprises aligning openings defined in the side wall with longitudinally extending wires of the bottom wall.

9. The method of claim 2, further comprising placing a bottom pan above the bottom wall.

10. The method of claim 2, wherein coupling a shelf assembly comprises:
pressing a hooked end of a U-shaped member of the shelf assembly into an opening defined in an interior face of the side wall or back wall; and
contacting a curved surface of the U-shaped member of the shelf assembly with the interior face,
wherein, when the shelf assembly is coupled to the side wall or back wall, the shelf assembly is maintained in a substantially horizontal position.

11. An animal enclosure assembly, comprising:
a base including a first side support, a second side support, and a plurality of front supports, the first and second side supports having receptacles spaced at each corner therefrom, and the plurality of front supports having pegs protruding from each end thereof and being coupled to the receptacles of the first and second side supports;
a door assembly and a back wall each having a top surface and a bottom surface, the bottom surfaces including a plurality of pegs protruding therefrom and being coupled to the first and second side supports;
a plurality of sleeves disposed near the top surface of both the door assembly and back wall;
a bottom wall having protruding wires coupled to the door assembly and back wall;
a side wall having a top edge and a bottom edge, the side wall further having a plurality of pegs protruding from the bottom edge which engage openings defined in the base and a plurality of tabs protruding from the top edge which engage the plurality of sleeves;
a top wall having a plurality of pegs protruding therefrom that engage openings defined in one of the door assembly, back wall, and side wall for coupling the top wall thereto;
a shelf assembly disposed substantially parallel with the top wall and bottom wall, the shelf assembly having a shelf with a U-shaped member, the U-shaped member having a hooked end that engages an opening defined in the side wall and a curved surface that rests against the side wall; and
a ramp having a hook disposed at one end thereof, the hook engaging the shelf such that the ramp is pivotably coupled thereto.

12. The animal enclosure assembly of claim 11, further comprising a second shelf assembly coupled to the base, the second shelf assembly being substantially parallel to the bottom wall and top wall.

13. The animal enclosure assembly of claim 11, further comprising:
a second animal enclosure assembly coupled to and disposed above the first animal enclosure assembly, the second animal enclosure assembly comprising:
a second door assembly having a frame and at least two doors hingedly coupled to the frame, the frame having a plurality of pegs which are coupled to corresponding openings defined in the top wall of the first enclosure assembly;
a second back wall having a plurality of pegs that engage openings defined in the top wall of the first enclosure assembly;
a second side wall having a top edge and a bottom edge, the second side wall further having a plurality of pegs protruding from its bottom edge which engage openings defined in the top wall of the first enclosure assembly and a plurality of tabs protruding from its top edge which engage openings defined in the second door assembly and second back wall;
a second top wall having a plurality of pegs protruding therefrom that are inserted into corresponding openings defined in the second door assembly, second back wall, and second side wall;
a second shelf assembly disposed substantially parallel with the first shelf assembly, the second shelf assembly having a shelf with a U-shaped member, the U-shaped member having a hooked end that engages an opening defined in the second side wall and a curved surface that rests against the second side wall; and
a second ramp having a hook disposed at one end thereof for pivotably coupling to the second shelf assembly; and
a third ramp having a hook assembly disposed at one end thereof for pivotably coupling to the top wall of the first enclosure assembly;
wherein the top wall of the first animal enclosure assembly comprises a cutout portion, the third ramp being coupled near the cutout portion for providing access between the first enclosure assembly and second enclosure assembly.

14. The animal enclosure assembly of claim 13, wherein the first assembly and second assembly are configured to be coupled to one another without the use of a tool or fastener.

* * * * *